(12) United States Patent
Park et al.

(10) Patent No.: US 12,517,461 B2
(45) Date of Patent: Jan. 6, 2026

(54) METHOD AND APPARATUS FOR TRANSMITTING HOLOGRAM DATA IN BINOCULAR HOLOGRAPHIC DISPLAY

(71) Applicant: ELECTRONICS AND TELECOMMUNICATIONS RESEARCH INSTITUTE, Daejeon (KR)

(72) Inventors: Min Sik Park, Sejong-si (KR); Hyun Eui Kim, Cheongju-si (KR); Joong Ki Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 8 days.

(21) Appl. No.: 18/639,092

(22) Filed: Apr. 18, 2024

(65) Prior Publication Data
US 2024/0353797 A1 Oct. 24, 2024

(30) Foreign Application Priority Data
Apr. 18, 2023 (KR) .......................... 10-2023-0050803

(51) Int. Cl.
*G03H 1/22* (2006.01)
*H04N 13/383* (2018.01)
(Continued)

(52) U.S. Cl.
CPC ......... *G03H 1/2294* (2013.01); *H04N 13/383* (2018.05); *H04N 13/388* (2018.05); *G03H 2001/0088* (2013.01)

(58) Field of Classification Search
CPC ......... G03H 1/2294; G03H 2001/0088; G03H 2001/2242; G03H 2226/05; G03H 1/28;
(Continued)

(56) References Cited

U.S. PATENT DOCUMENTS 10,401,794 B2 9/2019 Leister et al.
11,460,808 B2 10/2022 Zschau et al.
(Continued)

FOREIGN PATENT DOCUMENTS

KR 10-1741335 B1 5/2017
KR 10-2165447 B1 10/2020

OTHER PUBLICATIONS

David Blinder et al., "Accelerated computer generated holography using sparse bases in the STFT domain," Optics Express, Jan. 22, 2018.

*Primary Examiner* — Gims S Philippe

(57) ABSTRACT

A method and an apparatus for transmitting hologram data in binocular holographic display are disclosed. The method comprises obtaining left-eye gaze information and right-eye gaze information on a viewing window plane of the binocular holographic display based on pupil images of a user of the binocular holographic display; determining a left-eye hologram region and a right-eye hologram region on a hologram plane of the binocular holographic display based on the left-eye gaze information, the right-eye gaze information, and distance information between the viewing window plane and the hologram plane; and creating transmission hologram data corresponding to one binocular hologram region including an overlap hologram region, in which the left-eye hologram region and the right-eye hologram region overlap each other, based on input hologram data.

16 Claims, 7 Drawing Sheets

(51) Int. Cl.
*H04N 13/388* (2018.01)
*G03H 1/00* (2006.01)

(58) Field of Classification Search
CPC ............ G03H 2001/0413; G03H 1/04; G03H 1/0808; H04N 13/383; H04N 13/388; G02B 27/0103; G06F 3/013
See application file for complete search history.

(56) References Cited

U.S. PATENT DOCUMENTS

| | | | |
|---|---|---|---|
| 2010/0194745 A1* | 8/2010 | Leister | G03H 1/2294 345/419 |
| 2016/0042554 A1* | 2/2016 | Ogan | H04N 13/395 345/419 |
| 2016/0103321 A1* | 4/2016 | An | H04N 13/398 348/40 |
| 2016/0147003 A1* | 5/2016 | Morozov | G02B 27/10 362/613 |
| 2017/0295362 A1* | 10/2017 | Travis | H04N 13/128 |
| 2019/0064526 A1* | 2/2019 | Connor | G02B 6/0073 |
| 2020/0113434 A1* | 4/2020 | Padula | G02B 27/0172 |
| 2020/0326554 A1 | 10/2020 | Yoon | |
| 2022/0066391 A1* | 3/2022 | Sung | G03H 1/2294 |
| 2023/0143529 A1* | 5/2023 | Kim | G02B 27/30 359/13 |

\* cited by examiner

METHOD AND APPARATUS FOR TRANSMITTING HOLOGRAM DATA IN BINOCULAR HOLOGRAPHIC DISPLAY

CROSS-REFERENCE TO RELATED APPLICATION

The present application claims priority to Korean Patent Application No. 10-2023-0050803, filed on Apr. 18, 2023, the disclosures of which are incorporated by reference herein in their entireties.

TECHNICAL FIELD

The present disclosure relates to a method and apparatus for transmitting hologram data in a binocular holographic display. In detail, the present disclosure relates to a method and apparatus for creating transmission hologram data corresponding to one binocular hologram region determined on the basis of gaze information of a user of a binocular holographic display.

BACKGROUND

The statements in this section merely provide background information related to the present disclosure and do not necessarily constitute prior art.

A Spatial Light Modulator (SLM) constituting a digital holographic display produces 3D hologram images in a free space by inducing diffraction of a light wavefield through phase delay or amplitude control for a light wavefront of a coherent light such as a laser.

A spatial light modulator can adjust a diffraction of a light wavefield to desired angles within a maximum diffraction angle by changing the phase or the size for each cell of a display on the basis of a hologram pattern. In this case, the more the pixel pitch that is the gap between cells of the spatial light modulator is decreased, the larger the maximum diffraction angle.

It is required to decrease the size of a pixel pitch in order to produce a hologram for a larger field of view, but the maximum diffraction angle of spatial light modulators are 1 to 4 at the most due to limitation in the manufacturing process of displays such as a Liquid Crystal Display, a Digital Micro-mirror Display, and a Liquid Crystal on Silicon that are used for spatial light modulators Accordingly, there is a problem in that spatial light modulators of the related art provide fields of view that are not enough to observe holograms with both eyes.

In order to overcome this problem, a stereoscopic holographic display is used. In detail, a stereoscopic holographic display can separately create left-eye hologram data and right-eye hologram data using two spatial light modulators and can produce an entire hologram having an expanded field of view on the basis of the two created hologram data.

Since two different hologram data exist for one hologram in a stereoscopic holographic display, the transmission quality of hologram data may determine the quality of a produced hologram. In particular, when a hologram image is broadcasted or a service is provided using a stereoscopic holographic display, hologram data for both eyes should be transmitted without delay and disconnection in a limited transmission bandwidth in order to achieve an allowable service quality.

However, hologram data has a very large data amount and is very random, so lossless compression is not easy and lossy compression may be a factor of quality deterioration.

Accordingly, there is a need for a new method that can efficiently compress and transmit hologram data for both eyes.

SUMMARY

An objective of the present disclosure is to determine a left-eye hologram region and a right-eye hologram region on a hologram plane on the basis of left-eye gaze information and right-eye gaze information of a user and to create transmission hologram data corresponding to one binocular hologram region including an overlap hologram region in which the left-eye hologram region and the right-eye hologram region overlap each other The objectives of the present disclosure are not limited to the objectives described above and other objectives will be clearly understood by those skilled in the art from the following description.

An embodiment of the present disclosure provides a method for transmitting hologram data in a binocular holographic display, the method comprising: obtaining left-eye gaze information and right-eye gaze information on a viewing window plane of the binocular holographic display based on pupil images of a user of the binocular holographic display; determining a left-eye hologram region and a right-eye hologram region on a hologram plane of the binocular holographic display based on the left-eye gaze information, the right-eye gaze information, and distance information between the viewing window plane and the hologram plane; and creating transmission hologram data corresponding to one binocular hologram region including an overlap hologram region, in which the left-eye hologram region and the right-eye hologram region overlap each other, based on input hologram data.

Another embodiment of the present disclosure provides an apparatus for transmitting hologram data, the apparatus comprising: a memory storing one or more instructions; and one or more processors executing the one or more instructions stored in the memory, wherein the processor obtains left-eye gaze information and right-eye gaze information on a viewing window plane of a binocular holographic display based on pupil images of a user of the binocular holographic display; determines a left-eye hologram region and a right-eye hologram region on a hologram plane of the binocular holographic display based on the left-eye gaze information, the right-eye gaze information, and distance information between the viewing window plane and the hologram plane; and creates transmission hologram data corresponding to one binocular hologram region including an overlap hologram region, in which the left-eye hologram region and the right-eye hologram region overlap each other, based on input hologram data.

According to an embodiment of the present disclosure, by generating and transmitting transmission holographic data corresponding to one binocular holographic region, duplicate transmission of holographic data corresponding to overlapping holographic regions can be prevented, resulting in lossless compressed transmission of holographic data.

The advantageous effects of the present disclosure are not limited to those described above; other advantageous effects of the present disclosure not mentioned above may be understood clearly by those skilled in the art from the descriptions given below.

DETAILED DESCRIPTION

Figure 1:
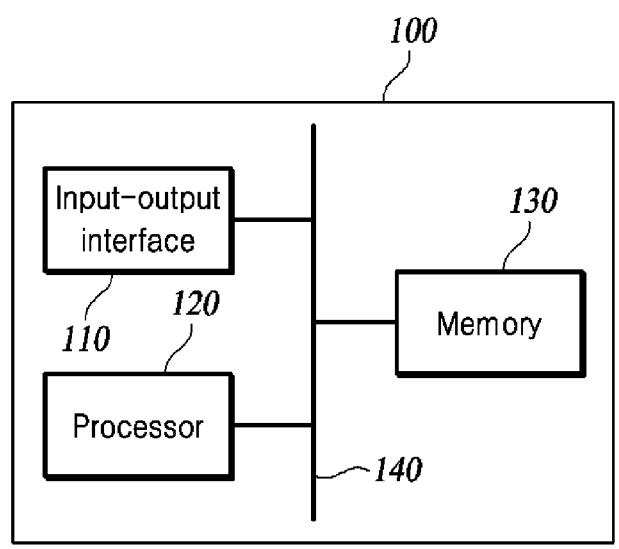
FIG. 1 is a block configuration diagram of an apparatus for transmitting hologram data according to an embodiment of the present disclosure.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

The following detailed description, together with the accompanying drawings, is intended to describe exemplary embodiments of the present disclosure and is not intended to represent the only embodiments in which the present disclosure may be practiced.

FIG. 1 is a block configuration diagram of an apparatus for transmitting hologram data according to an embodiment of the present disclosure.

An apparatus 100 for transmitting hologram data includes all or some of an input output-interface 110, a processor 120, and a memory 130. In this configuration, the input output-interface 110, the processor 120, and the memory 130 can transmit data to each other through a bus 140.

Not all of the blocks shown in FIG. 1 are necessary components of the apparatus 100 for transmitting hologram data and some blocks included in the apparatus 100 for transmitting hologram data may be added, changed, or removed in other embodiments.

The input-output interface 110 may be connected with an external server or a storage device and may receive input hologram data. For example, the input-output interface 110 may be connected for communication to an external hologram data streaming server or hologram data storage device and may receive left-eye hologram data and right-eye hologram data for one hologram object.

Further, the input-output interface 110 may be connected with an external device and may receive gaze information of a user of a binocular holographic display. For example, the input-output interface 110 may be connected with a specific image processing module, which detects the positions of pupils or tracks movement of pupils on the basis of images of the pupils of the left eye and the right eye of a user, and may receive position information of the pupils of the left eye and the right eye of the user and gaze information of the user.

The input-output interface 110 can transmit transmission hologram data created by the processor 120 to the memory 130 or a binocular holographic display connected to the apparatus 100 for transmitting hologram data. In this configuration, the input-output interface 110 may further include a hardware module such as a network interface card, a network interface chip, and a networking interface port or a software module such as a network device driver or a networking program to configure communication connection.

The processor 120 obtains left-eye gaze information and right-eye gaze information on a viewing window plane of a binocular holographic display on the basis of pupil images of a user.

A user watches holograms that are produced by a binocular holographic display by moving the pupils of the left eye and the right eye. It is possible to extract gaze information of a user by analyzing images of the pupils of both eyes of the user.

Gaze information may include position information of a pupil and gaze direction information of a pupil of a user. For example, the processor can detect pupil centers of a left eye and a right eye from pupil images of the pupils of a user and can determine each of the pupil center positions of the left eye and the right eye on a viewing window plane as position information of a pupil.

Further, the processor 120 can detect a gaze direction of a user for watching a hologram by tracking movement of pupils from pupil images. In this case, the gaze direction may be a direction angle of a gaze of a user from the front direction of a pupil of the user, that is, the direction of a normal from a pupil center position on a viewing window plane to a hologram plane. The processor 120 can determine direction angles of gazes at pupil center positions of a left eye and a right eye as a left-eye gaze direction and a right-eye gaze direction, respectively.

The processor 120 determines a left-eye hologram region and a right-eye hologram region on the hologram plane on the basis of left-eye gaze information and right-eye gaze information.

The processor 120 determines a left-eye gaze reaching point that the left-eye gaze of a user reaches on the hologram plane on the basis of the left-eye gaze information and distance information between the viewing window plane and the hologram plane. In this case, the viewing window plane and the hologram plane may be planes that are spaced a preset distance apart from each other and are parallel with each other. Accordingly, it is possible to calculate a left-eye gaze vector from a left-eye pupil center position to the hologram plane using the distance information between the viewing window plane and the hologram plane and the direction angle of the left-eye gaze.

The processor 120 calculates a left-eye gaze vector on the basis of the distance information between the viewing window plane and the hologram plane and the direction angle of the left-eye gaze and determines the point at which the left-eye gaze vector and the hologram plane meet as a left-eye gaze reaching point. The processor 120 can determine a right-eye gaze reaching point on the hologram plane by performing the same process on the right-eye gaze information as well.

The processor 120 can determine the left-eye hologram region on the basis of the left-eye gaze reaching point and preset left-eye hologram resolution information and can determine the right-eye hologram region on the basis of the right-eye gaze reaching point and preset right-eye hologram resolution information.

The field of view of the left-eye pupil of a user and the field of view of the right-eye pupil of the user are different from each other. Accordingly, different items of hologram object information are provided to the left-eye pupil and the right-eye pupil of a user who observes a same hologram object. Accordingly, a left-eye pupil is provided with a left-eye gaze reaching point on a hologram plane and hologram object information corresponding to a predetermined region around the left-eye gaze reaching point, that is, a left-eye hologram region, and the right-eye pupil is provided with hologram object information different from the left-eye pupil, a right-eye gaze reaching point on the hologram plane and hologram object information corresponding to a predetermined region around the right-eye gaze reaching point, that is, a right-eye hologram region.

The processor 120 determines a region, which has the left-eye gaze reaching point as a center point and has a size determined on the basis of hologram region height information and hologram region width information included in the left-eye hologram resolution information, on the hologram plane as the left-eye hologram region. Similarly, the processor 120 determines a region, which has the right-eye gaze reaching point as a center point and has a size determined on the basis of hologram region height information and hologram region width information included in the right-eye hologram resolution information, on the hologram plane as the right-eye hologram region. In this case, the right-eye hologram resolution information and the left-eye hologram resolution information may include same resolution information, but are not limited thereto and may include different items of resolution information, depending on setting by a user. For example, a user may set right-eye hologram resolution information and left-eye hologram resolution information such that any one of the items of resolution information has a larger width due to different eye strengths of the left and right eyes.

The processor 120 creates transmission hologram data corresponding to one binocular hologram region including an overlap hologram region, in which the left-eye hologram region and the right-eye hologram region overlap each other, on the basis of input hologram data.

Some regions may overlap each other, depending on the positions of the left-eye hologram region and the right-eye hologram region on the hologram plane. The processor 120 determines one binocular hologram region including an overlap hologram region in which the left-eye hologram region and the right-eye hologram region overlap each other.

In detail, the processor 120 determines one region, which is composed of an overlap hologram region of the left-eye hologram region and the right-eye hologram region, the other non-overlap region excluding the overlap hologram region from the left-eye hologram region, and the other non-overlap region excluding the overlap hologram region from the right-eye hologram region, as a binocular hologram region.

The processor 120 creates transmission hologram data on the basis of hologram data corresponding to the binocular hologram region in the input hologram data. In this case, the input hologram data may be Fourier hologram data that is input to a spatial light modulator of a binocular holographic display, but is not limited thereto. For example, the input hologram data may be Fresnel hologram data and the processor 120 can convert Fresnel hologram data into Fourier hologram data and can create transmission hologram data using the Fourier hologram data.

When left-eye hologram data corresponding to a left-eye hologram region and right-eye hologram data corresponding to a right-eye hologram region are separately extracted and transmitted in a binocular holographic display, it results in repetitive transmission of hologram data corresponding to an overlap hologram region. In detail, when left-eye hologram data is transmitted, hologram data for a non-overlap region and hologram data corresponding to an overlap hologram region in a left-eye hologram region are transmitted, and when right-eye hologram data is transmitted, hologram data for a non-overlap region and hologram data corresponding to an overlap hologram region in a right-eye hologram region are transmitted, so it results in twice transmission of the hologram data corresponding to the overlap hologram region.

On the other hand, when transmission hologram data created by the processor 120 is transmitted, hologram data corresponding to the non-overlap region of a right-eye hologram region, hologram data corresponding to the non-overlap region of a left-eye hologram region, and hologram data corresponding to an overlap hologram region are each transmitted one time. As a result, transmission hologram data created by the processor 120 provides an effect of compressing and transmitting hologram data without a loss by hologram data corresponding to an overlap hologram region in comparison to the case of separately extracting and transmitting left-eye hologram data and right-eye hologram data.

In this case, the ratio of the overlap hologram region to a binocular hologram region may be changed. For example, the position and the size of an overlap hologram region may depend on at least any one of the gaze directions of the left eye and the right eye of a user, the center positions for the left-eye and right-eye pupils, and hologram resolution information, and the larger the ratio of the overlap hologram region in a binocular hologram region, the larger the compression ratio of hologram data may be.

The memory 130 may include a volatile memory, a permanent memory, a virtual memory, or other kinds of memories that are used in the apparatus 100 for transmitting hologram data or that store information that is output from the apparatus. For example, the memory 130 may include a RAM (random access memory or a DRAM (dynamic RAM).

The memory 130 stores fundamental programs, application programs, network setting information, etc. for operation of the apparatus 100 for transmitting hologram data. Further, the storage unit 130 can provide the kept information in response to a request from the processor 120.

The memory 130 can store various data for processing or controlling of the apparatus 100 for transmitting hologram data. For example, gaze information of a user, distance information between a viewing window plane and a hologram plane, hologram resolution information, etc. may be stored in the memory 130.

Further, the memory 130 can store various data created by the apparatus 100 for transmitting hologram data. For example, individual position information of one binocular hologram region, which includes a left-eye hologram region, a right-eye hologram region, and an overlap hologram region determined by the processor 120, on a hologram plane, input hologram data, transmission hologram data, etc. may be stored in the memory 130.

Figure 2:
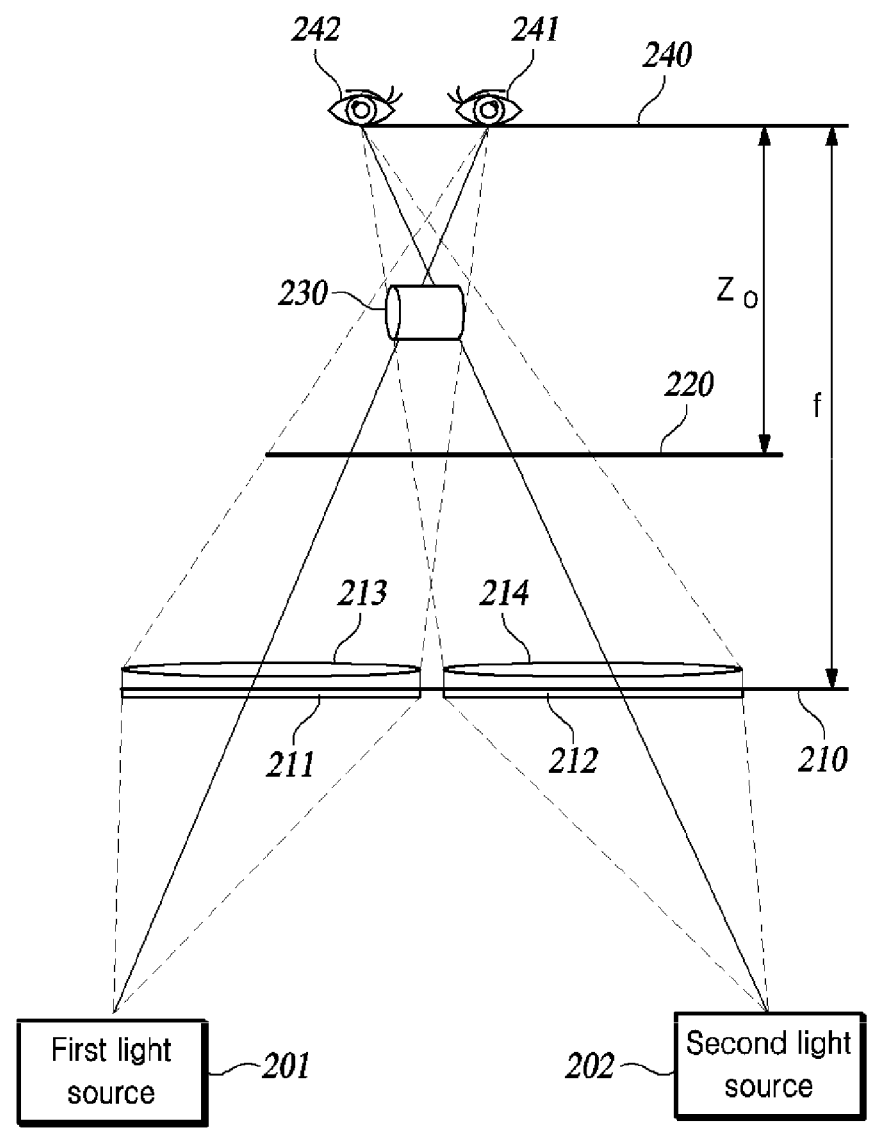
FIG. 2 is a diagram illustrating a process in which a binocular holographic display according to an embodiment of the present disclosure produces a hologram.

FIG. 2 is a diagram illustrating a process in which a binocular holographic display according to an embodiment of the present disclosure produces a hologram.

Referring to FIG. 1, a binocular holographic display 200 can reproduce a hologram object 230 and a user can observe the 3D hologram object 230 using a left eye 241 and a right eye 242.

The binocular holographic display 200 reproduce a 3D hologram object 230 by creating light fields respectively corresponding to a left eye and a right eye using a first spatial light modulator 211 and a second spatial light modulator 212 that are spatially separated.

The first spatial light modulator (SLM) 211 modulates the phase and the magnitude of incident light from a first light source 201 on the basis of input left-eye hologram data. The light with the modulated phase and magnitude converges toward the left eye 241 through a first field lens 213, thereby forming a light field on a viewing window plane 240.

The second spatial light modulator 212 outputs modulated light by modulating the phase and the magnitude of incident light from a second light source 202 on the basis of input right-eye hologram data. The light output from the second spatial light modulator (SLM) 212 converges toward the right eye 242 through a second field lens 214, thereby forming a light field on the viewing window plane 240.

The user can observe a 3D hologram object 230 reproduced in a free space on the basis of the information of the light fields formed on the viewing window plane 240 and transmitted to the left eye 241 and the right eye 242.

In this case, the information of the light fields formed on the viewing window plane 240 can be calculated using Equation 1 on the basis of the information of the hologram object 230 included in an object plane 220.

$$U_v(x_v, y_v) = \frac{e^{jkz_o}}{j\lambda z_o} e^{-jk\frac{(x_v^2+y_v^2)}{2z_o}} \int\int \left\{ U_o(x_o, y_o) e^{jk\frac{(x_o^2+y_o^2)}{2z_o}} \right\} e^{-jk\frac{(x_o x_v + y_o y_v)}{z_o}} dx_o dy_o \quad \text{[Equation 1]}$$

$$= \frac{e^{jkz_o}}{j\lambda z_o} e^{-jk\frac{(x_v^2+y_v^2)}{2z_o}} F_{(x_o,y_o)} \left\{ U_o(x_o, y_o) e^{jk\frac{(x_o^2+y_o^2)}{2z_o}} \right\}$$

where $U_v(x_v, y_v)$ is the information of the light fields formed on the viewing window plane 240 and $U_o(x_o, y_o)$ is the information of the hologram object 230 included in an object plane 220. Further, Zo is, as shown in the figures, the distance between the object plane 220 and the viewing window plane 240.

It is possible to calculate light field information on a spatial light modulator plane 210 for the hologram object 230 on the basis of the information of the light fields formed on the viewing window plane 240 for the hologram object 230. The process of calculating the information of the light fields on the spatial light modulator plane 210 is as the following Equation 2.

$$U_s(x_s, y_s) = \frac{e^{jkf}}{j\lambda f} e^{jk\frac{(x_s^2+y_s^2)}{2f}} e^{-jk\frac{(x_s^2+y_s^2)}{2f}} \int\int U_v(x_v, y_v) e^{-jk\frac{(x_v^2+y_v^2)}{2f}} e^{jk\frac{(x_v x_s + y_v y_s)}{f}} dx_v dy_v \quad \text{[Equation 2]}$$

$$= \frac{e^{jkf}}{j\lambda f} \int\int U_v(x_v, y_v) e^{-jk\frac{(x_v^2+y_v^2)}{2f}} e^{jk\frac{(x_v x_s + y_v y_s)}{f}} dx_v dy_v$$

$$= \frac{e^{jkf}}{j\lambda f} F^{-1}_{(x_v,y_v)} \left\{ U_v(x_v, y_v) e^{-jk\frac{(x_v^2+y_v^2)}{2f}} \right\}$$

where $U_s(x_s, y_s)$ is the information of the light fields on the spatial light modulator plane 210 and f is, as shown in the figures, the distance between the spatial light modulator plane 210 and the viewing window plane 240.

It is possible to calculate the information of the light fields on the spatial light modulator plane 210 using Equation 1 and Equation 2 described above on the basis of the information of the 3D hologram object 230 reproduced by the binocular holographic display 200. That is, it is possible to calculate left-eye light field data on the viewing window plane 240 on the basis of the information of the hologram object 230 and to create left-eye hologram data that is input to the first spatial light modulator 211 on the basis of the calculated left-eye light field data. Similarly, it is possible to calculate right-eye light field data on the viewing window plane 240 on the basis of the information of the hologram object 230 and create right-eye hologram data that is input to the second spatial light modulator 212 using the calculated right-eye light field data.

Figure 3:
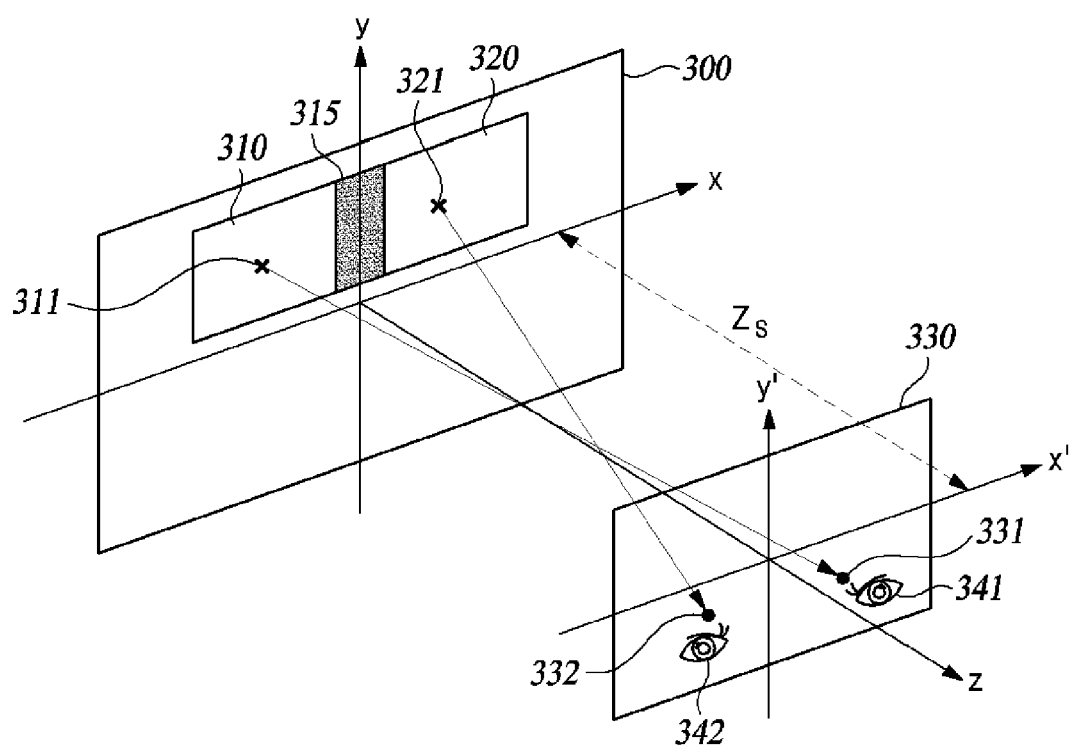
FIG. 3 is a diagram showing a left-eye hologram region and a right-eye hologram region formed on a hologram plane of a binocular holographic display according to an embodiment of the present disclosure.

FIG. 3 is a diagram showing a left-eye hologram region and a right-eye hologram region formed on a hologram plane of a binocular holographic display according to an embodiment of the present disclosure.

Referring to FIG. 2, a right-eye hologram region 310 and a left-eye hologram region 320 are formed on a hologram plane 300 of the binocular holographic display. In this case, the right-eye hologram region 310 and the left-eye hologram region 320 may form an overlap hologram region 315 by overlapping each other in some regions.

When right-eye hologram data corresponding to the right-eye hologram region 310 including the overlap hologram region 315 is input to the right-eye spatial light modulator, light modulated on the basis of the right-eye hologram data travels toward the right eye 341, thereby forming a right-eye light field on a viewing window plane 330.

The right-eye light field on the viewing window plane 330 may be formed in a region around the center point 331 of the right-eye pupil that corresponds to a reference point 311 of the right-eye hologram region 310. In this case, the reference point 311 of the right-eye hologram region 310 may be the center point of the right-eye hologram region 310.

When left-eye hologram data corresponding to the left-eye hologram region 320 including the overlap hologram region 315 is input to the left-eye spatial light modulator, modulated light travels toward the left eye 342, thereby forming a left-eye light field on a viewing window plane 330. In this case, the left-eye light field may be formed in a region around the center point 332 of the left-eye pupil that corresponds to a reference point 321 of the left-eye hologram region 320, and the reference point 321 of the left-eye hologram region 320 may be the center point of the left-eye hologram region 320.

Since the right-eye hologram region 310 and the left-eye hologram region 320 overlap each other, an overlap portion is generated between the hologram data corresponding to the right-eye hologram region 310 and the hologram data corresponding to the left-eye hologram region 320. The apparatus for transmitting hologram data according to an embodiment of the present disclosure can transmit hologram data corresponding to one binocular hologram region including the overlap hologram region 315 instead of transmitting hologram data for each of a left eye and a right eye. As a result, it is possible to reduce the transmission amount of hologram data required to reproduce a same hologram object and it is possible to efficiently use a limited transmission bandwidth.

Figure 4:
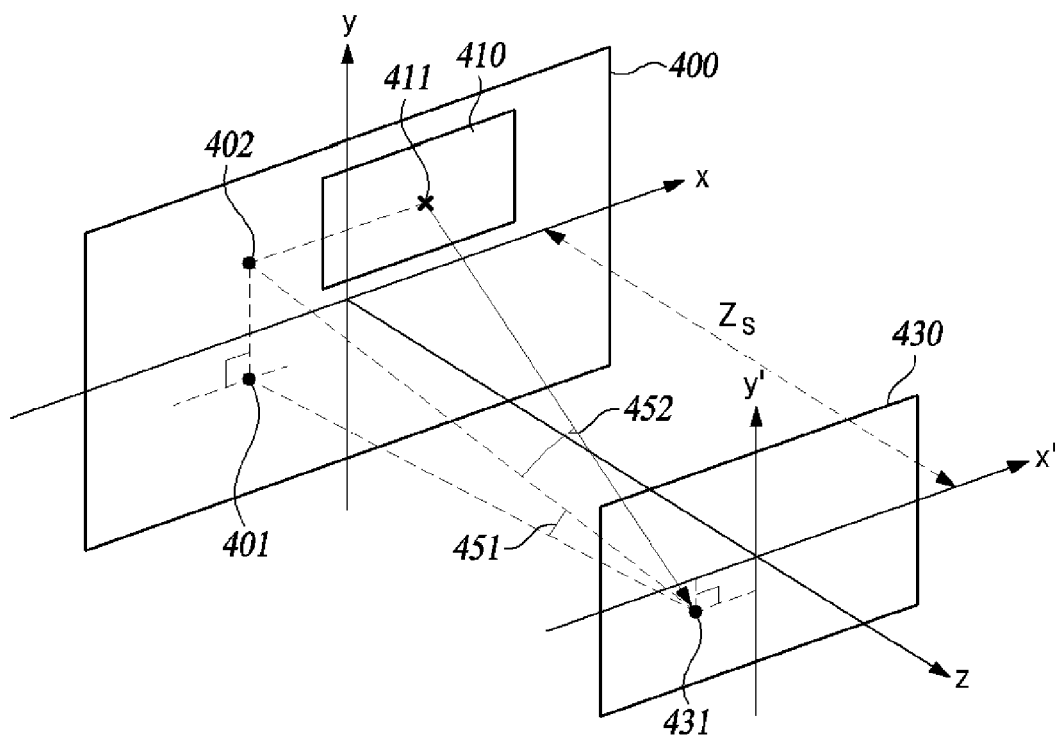
FIG. 4 is a diagram illustrating a process in which the apparatus for transmitting hologram data according to an embodiment of the present disclosure determines a gaze reaching point on a hologram plane on the basis of gaze information.

FIG. 4 is a diagram illustrating a process in which the apparatus for transmitting hologram data according to an embodiment of the present disclosure determines a gaze reaching point on a hologram plane on the basis of gaze information.

Referring to FIG. 4, a hologram plane 400 exists in an xy coordinate plane and a viewing window plane 430 exists in an x'y' coordinate plane. In this case, the x axis and the y axis of the xy coordinate plane have a distance Zs from the x' axis and the y' axis of the x'y' coordinate plane, respectively, and are parallel with each other. Further, the origin of the xy coordinate plane and the origin of the x'y' coordinate plane exist on a same z axis. That is, the xy coordinate plane and the x'y' coordinate plane are two planes having a distance Zs and being parallel with each other.

The apparatus for transmitting hologram data obtains (xlc',ylc') that is an x'y' coordinate value corresponding to a left-eye pupil center position 431 on the viewing window plane 430 on the basis of a left-eye pupil image of a user.

The apparatus for transmitting hologram data determines a left-eye gaze reaching point 411 on the hologram plane 400 on the basis of left-eye gaze direction information and distance information between the hologram plane 400 and the viewing window plane 430. In this case, the left-eye gaze direction information may be information created on the basis of movement of the pupil in the left-eye pupil image of the user.

In detail, it is possible to set an orthogonal projection of the left-eye pupil center position 431 and the viewing window plane 430 as a first point 401 and it is possible to set a point spaced apart from the first point 401 by the vertical distance between the first point 401 and the left-eye gaze reaching point 411 as a second point 402. In this case, the distance between the left-eye pupil center position 431 and the first point 401 is the same as Zs that is the distance between the hologram plane 400 and the viewing window plane 430.

When the left-eye gaze direction from the left-eye pupil center position 431 to the left-eye gaze reaching point 411 is divided into a vertical component and a horizontal component, a first angle 451 made by the directions from the left-eye pupil center position 431 to the first point 401 and the second point 402 is the same as the angle of the vertical component of the left-eye gaze direction, and a second angle 452 made by the directions from the left-eye pupil center position 431 to the second point 402 and the left-eye gaze reaching point 411 is the same as the angle of the horizontal component of the left-eye gaze direction. Accordingly, the apparatus for transmitting hologram data can determine the distance from the left-eye pupil center position 431 to the second point 402 and the accurate position of the second point 402 on the basis of Zs and the first angle 451 and it is possible to determine the accurate position of the left-eye gaze reaching point 411 on the basis of the distance from the left-eye pupil center position 431 to the second point 402, the position of the second point 402, and the second angle 452. The process of determining the left-eye gaze reaching point 411 on the basis of the left-eye pupil center position, the left-eye gaze direction, and Zs that is the distance between the hologram plane 400 and the viewing window plane 430 may be expressed as Equation 1.

$$(xl_c, yl_c) = \left( xl'_c + z_s \times \frac{\tan\varphi_l}{\cos\theta_l}, yl'_c + z_s \times \tan\theta_l \right) \qquad \text{[Equation 3]}$$

where $(xl_c, yl_c)$ is the coordinate of the left-eye gaze reaching point 411 on the xy coordinate plane, $\theta_l$ is the first angle 451, and $\varphi_l$ is the second angle 452. In this case, the xy coordinate value of the first point 401 has the same coordinate value as $(xl_c', yl_c')$ that is the x'y' coordinate value of the left-eye pupil center position 431.

The apparatus for transmitting hologram data can determine a left-eye hologram region 410 on the hologram plane 400 on the basis of the determined left-eye gaze reaching point 411. For example, the apparatus for transmitting hologram data can determine a region having the left-eye gaze reaching point 411 as a center point and having a size determined in accordance with preset left-eye hologram resolution information as the left-eye hologram region 410.

The process of determining the left-eye gaze reaching point 411 is shown in FIG. 4, but the apparatus for transmitting hologram data can determine a right-eye gaze reaching point (not shown) by repeatedly performing the process on a right eye.

Figure 5:
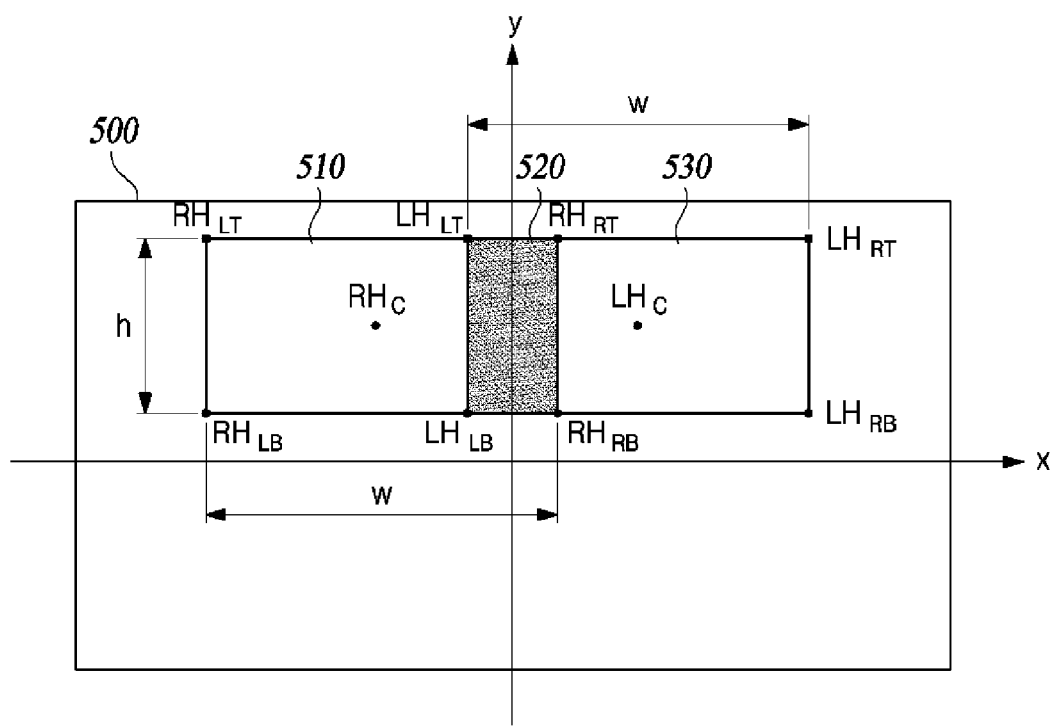
FIG. 5 is a diagram illustrating a process in which the apparatus for transmitting hologram data according to an embodiment of the present disclosure determines one binocular hologram region.

FIG. 5 is a diagram illustrating a process in which the apparatus for transmitting hologram data according to an embodiment of the present disclosure determines one binocular hologram region.

Referring to FIG. 5, the apparatus for transmitting hologram data determines a left-eye hologram region LHLT-LHRT-LHRB-LHLB having a left-eye gaze reaching point LHc as a center point on a hologram plane 500 and determines a right-eye hologram region RHLT-RHRT-RHRB-RHLB having a right-eye gaze reaching point RHc as a center point. In this case, left-eye hologram resolution information and right-eye hologram resolution information are set to have same resolution, that is, same height h and width w, but are not limited thereto. According to other embodiments, the left-eye hologram resolution information and the right-eye hologram resolution information may be set to have different heights or widths.

The apparatus for transmitting hologram data determines a left-eye hologram region on the basis of a coordinate value $(xl_c, yl_c)$ that is the coordinate of the left-eye gaze reaching point LHc and hologram resolution information. In this case, the coordinates of the four vertexes $LH_{LT}$-$LH_{RT}$-$LH_{RB}$-$LH_{LB}$ constituting the left-eye hologram region can be determined using Equation 4.

$$LH_{LT}: (xl_{LT}, yl_{LT}) = \left(xl_c - \frac{w}{2}, yl_c + \frac{h}{2}\right) \quad \text{[Equation 4]}$$

$$LH_{LB}: (xl_{LB}, yl_{LB}) = \left(xl_c - \frac{w}{2}, yl_c - \frac{h}{2}\right)$$

$$LH_{RB}: (xl_{RB}, yl_{RB}) = \left(xl_c + \frac{w}{2}, yl_c - \frac{h}{2}\right)$$

$$LH_{RT}: (xl_{RT}, yl_{RT}) = \left(xl_c + \frac{w}{2}, yl_c + \frac{h}{2}\right)$$

Similar to the left-eye hologram region, the apparatus for transmitting hologram data determines a right-eye hologram region on the basis of a coordinate value $(xr_c, yr_c)$ that is the coordinate of the right-eye gaze reaching point RHc and the hologram resolution information. In this case, the coordinates of the four vertexes $RH_{LT}$-$RH_{RT}$-$RH_{RB}$-$RH_{LB}$ constituting the right-eye hologram region can be determined using Equation 5.

$$RH_{LT}: (xr_{LT}, yr_{LT}) = \left(xr_c - \frac{w}{2}, yr_c + \frac{h}{2}\right) \quad \text{[Equation 5]}$$

$$RH_{LB}: (xr_{LB}, yr_{LB}) = \left(xr_c - \frac{w}{2}, yr_c - \frac{h}{2}\right)$$

$$RH_{RB}: (xr_{RB}, yr_{RB}) = \left(xr_c + \frac{w}{2}, yr_c - \frac{h}{2}\right)$$

$$RH_{RT}: (xr_{RT}, yr_{RT}) = \left(xr_c + \frac{w}{2}, yr_c + \frac{h}{2}\right)$$

The right-eye hologram region and the left-eye hologram region overlap each other in some regions on the hologram plane 500. Accordingly, the apparatus for transmitting hologram data determines one binocular hologram region including an overlap hologram region 520. In this case, the one binocular hologram region can be determined on the basis of two left vertexes $RH_{LT}$ and $RH_{LB}$ constituting the right-eye hologram and two right vertexes $LH_{RT}$ and $LH_{RB}$ constituting the left-eye hologram.

The one binocular hologram region is composed of a non-overlap region 510 of the right-eye hologram region and a non-overlap region 530 of the left-eye hologram region. The apparatus for transmitting hologram data can compress and transmit hologram data by hologram data corresponding to the overlap hologram region 520 without deterioration of a hologram production quality by creating and transmitting transmission hologram data corresponding to a binocular hologram region $RH_{LT}$-$RH_{LB}$-$LH_{RB}$-$LH_{RT}$ instead of left-eye hologram data corresponding to the left-eye hologram region $LH_{LT}$-$LH_{RT}$-$LH_{RB}$-$LH_{LB}$ and right-eye hologram data corresponding to the right-eye hologram region $RH_{LT}$-$RH_{RT}$-$RH_{RB}$-$RH_{LB}$. In this case, the compression ratio of transmission hologram data created by apparatus for transmitting hologram data is as Equation 6.

$$\text{Compression Ratio} = \begin{cases} 1 - \frac{(xr_{RT} - xl_{LT})}{2w} & xr_{RT} - xl_{LT} \geq 0 \\ 1 & xr_{RT} - xl_{LT} < 0 \end{cases} \quad \text{[Equation 6]}$$

The compression ratio of transmission hologram data is proportioned to the area ratio of the overlap hologram region 520 to the binocular hologram region $RH_{LT}$-$RH_{LB}$-$LH_{RB}$-$LH_{RT}$. In this case, Equation 6 is an equation for calculating a compression ratio under the assumption that RHc that is the center point of the right-eye hologram region and LHc that is the center point of the left-eye hologram region have a same y coordinate value and the resolution values for the left-eye hologram region and the right-eye hologram region are the same. According to other embodiments, RHc and LHc may have different y coordinate values and the resolution values for the left-eye hologram region and the right-eye hologram region may be different, the equation for calculating a compression ratio of a transmission hologram data may become different from Equation 6.

Figure 6:
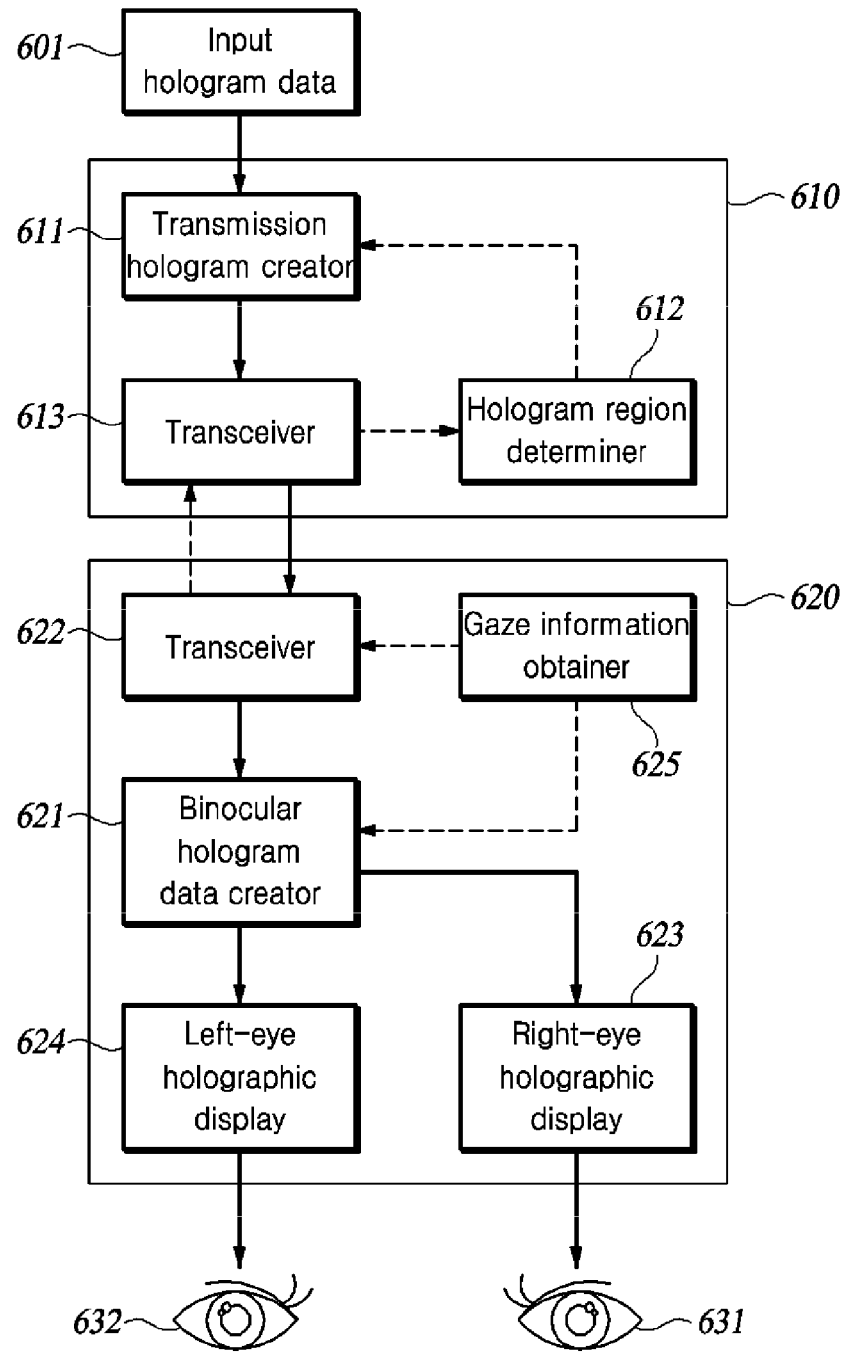
FIG. 6 is a block configuration diagram of a hologram data transmission system according to another embodiment of the present disclosure.

FIG. 6 is a block configuration diagram of a hologram data transmission system according to another embodiment of the present disclosure.

Referring to FIG. 6, a hologram data transmission system including a transmission-side apparatus 610 and a reception-side apparatus 620 that can efficiently transmit transmission hologram data is shown. For example, the transmission-side apparatus 610 may be a server that creates and transmits transmission hologram data to be transmitted to a binocular holographic display and the reception-side apparatus 620 may be a user terminal that is connected with the server for communication, receives transmission hologram data, and has a binocular holographic display function of producing a 3D hologram object to a user, but they are not limited thereto and the hologram data transmission system may be configured in various types.

The transmission-side apparatus 610 may include a transmission hologram data creator 611, a hologram region determiner 612, and a transceiver 613.

The transmission hologram data creator 611 creates transmission hologram data on the basis of input hologram data 601 and information of a binocular hologram region determined by the hologram region determiner 612. In this case, the input hologram data 601 may be data about a wide angle hologram that is input from any one of an external hologram storage apparatus, hologram obtaining apparatus, and hologram creating apparatus.

The input hologram data 601 may be a Fourier hologram type or a Fresnel hologram type. The transmission hologram data creator 611 may further include a Fourier hologram converter (not shown) that converts the input hologram data 601 into a Fourier hologram when the input hologram data 601 is Fresnel hologram data.

The hologram region determiner 612 can determine a binocular hologram region in the input hologram 601 using holographic display resolution information and left-eye and right-eye gaze information of a user transmitted from the transceiver 613. Information of the determined binocular hologram region is transmitted to the transmission hologram data creator 611 and is used to create transmission hologram data.

The transceiver 613 of the transmission-side apparatus 610 can receive the left-eye and right-eye gaze information of the user from the reception-side apparatus 620 or can transmit the transmission hologram data to the reception-side apparatus 620.

The reception-side apparatus 620 may include a binocular hologram data creator 621, a transceiver 622, a right-eye holographic display 623, a left-eye holographic display 624, and a gaze information obtainer 625.

The binocular hologram data creator 621 determines a left-eye hologram region and a right-eye hologram region using holographic display resolution information and left-eye and right-eye gaze information of a user transmitted from the gaze information obtainer 625 and extracts hologram data respectively corresponding to the left-eye hologram region and the right-eye hologram region from the transmission hologram data transmitted from the transmission-side apparatus 610, thereby creating left-eye hologram data and right-eye hologram data.

The right-eye holographic display 623 and the left-eye holographic display 624 reproduce a 3D hologram object in a free space on the basis of the right-eye hologram data and the left-eye hologram data created by the binocular hologram data creator 621. The user can observe the 3D hologram object using a right eye 631 and a left eye 632.

The gaze information obtainer 625 calculates pupil center positions (i.e. center of pupil) and gaze directions and creates left-eye and right-eye gaze information by performing image processing on left-eye and right-eye pupil images of the user obtained from an video sensor or a depth sensor.

The transceiver 622 of the reception-side apparatus 620 can transmit the left-eye and right-eye gaze information of the user to the transmission-side apparatus 610 or can receive transmission hologram data for the binocular hologram region transmitted from the transmission-side apparatus 610.

Figure 7:
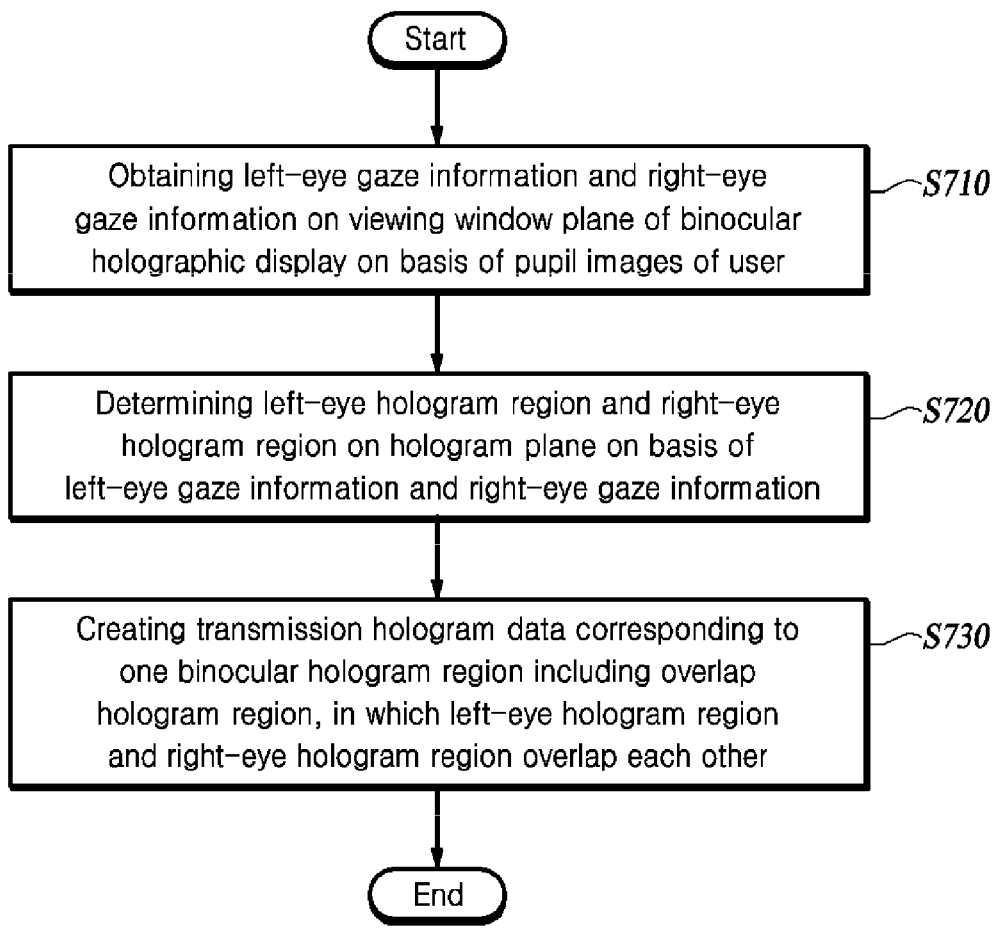
FIG. 7 is a flowchart illustrating a method of transmitting hologram data according to an embodiment of the present disclosure.

FIG. 7 is a flowchart illustrating a method of transmitting hologram data according to an embodiment of the present disclosure.

Referring to FIG. 7, an apparatus for transmitting hologram data obtains left-eye gaze information and right-eye gaze information on a viewing window plane of a binocular holographic display on the basis of pupil images of a user (S710).

The apparatus for transmitting hologram data can extract gaze information of a user by analyzing images of the pupils of both eyes of the user. In this case, the gaze information may include position information of a pupil and gaze direction information of a pupil of a user. For example, the apparatus for transmitting hologram data detects center of pupil for a left eye and a right eye from pupil images of the pupils of a user and determines each center of pupil for the left eye and the right eye on a visual window plane as position information of a pupil.

Further, the apparatus for transmitting hologram data can extract a direction angle of a gaze of a user from the front direction of a pupil of the user, that is, the direction of a normal from a center of pupil on a viewing window plane to a hologram plane by tracking movement of a pupil in a pupil image. The apparatus for transmitting hologram data can determine direction angles of gazes at pupil center positions of a left eye and a right eye as a left-eye gaze direction and a right-eye gaze direction, respectively.

The apparatus for transmitting hologram data determines a left-eye hologram region and a right-eye hologram region on the hologram plane on the basis of the left-eye gaze information and the right-eye gaze information (S720).

The apparatus for transmitting hologram data determines a left-eye gaze reaching point that the left-eye gaze of the user reaches on the hologram plane on the basis of the left-eye gaze information and the distance information between the viewing window plane and the hologram plane. In this case, the viewing window plane and the hologram plane may be planes that are spaced a preset distance apart from each other and are parallel with each other. Accordingly, it is possible to calculate a left-eye gaze vector from a left-eye pupil center position to the hologram plane using the distance information between the viewing window plane and the hologram plane and the direction angle of the left-eye gaze.

The apparatus for transmitting hologram data calculates a left-eye gaze vector on the basis of the distance information between the viewing window plane and the hologram plane and the direction angle of the left-eye gaze and determines the point at which the left-eye gaze vector and the hologram plane meet as a left-eye gaze reaching point. The apparatus for transmitting hologram data determines a right-eye gaze reaching point on the hologram plane by performing the same process on the right-eye gaze information as well.

The apparatus for transmitting hologram data can determine the left-eye hologram region on the basis of the left-eye gaze reaching point and preset left-eye hologram resolution information and can determine the right-eye hologram region on the basis of the right-eye gaze reaching point and preset right-eye hologram resolution information.

In detail, the apparatus for transmitting hologram data determines a region, which has the left-eye gaze reaching point as a center point and has a size determined on the basis of hologram region height information and hologram region width information included in the left-eye hologram resolution information, on the hologram plane as the left-eye hologram region. Similarly, the apparatus for transmitting hologram data determines a region, which has the right-eye gaze reaching point as a center point and has a size determined on the basis of hologram region height information and hologram region width information included in the right-eye hologram resolution information, on the hologram plane as the right-eye hologram region.

The right-eye hologram resolution information and the left-eye hologram resolution information may include same resolution information, but are not limited thereto and may include different items of resolution information, depending on setting by a user.

The apparatus for transmitting hologram data creates transmission hologram data corresponding to one binocular hologram region including an overlap hologram region, in which the left-eye hologram region and the right-eye hologram region overlap each other, on the basis of input hologram data (S730).

Some regions may overlap each other, depending on the positions of a left-eye hologram region and a right-eye hologram region on a hologram plane. The apparatus for transmitting hologram data determines one binocular hologram region including an overlap hologram region in which the left-eye hologram region and the right-eye hologram region overlap each other.

In detail, the apparatus for transmitting hologram data determines one region, which is composed of an overlap hologram region of the left-eye hologram region and the right-eye hologram region, the other non-overlap region excluding the overlap hologram region from the left-eye hologram region, and the other non-overlap region excluding the overlap hologram region from the right-eye hologram region, as a binocular hologram region.

The apparatus for transmitting hologram data creates transmission hologram data on the basis of hologram data corresponding to the binocular hologram region in input hologram data. In this case, the input hologram data may be Fourier hologram data that is input to a spatial light modulator of a binocular holographic display, but is not limited thereto. For example, the input hologram data may be Fresnel hologram data and the processor 120 can convert Fresnel hologram data into Fourier hologram data and can create transmission hologram data using the Fourier hologram data.

When left-eye hologram data and right-eye hologram data are separately extracted and transmitted in a binocular holographic display, hologram data corresponding to an overlap hologram region is repeatedly transmitted. In detail, when left-eye hologram data is transmitted, hologram data for a non-overlap region and hologram data corresponding to an overlap hologram region in a left-eye hologram region are transmitted, and when right-eye hologram data is transmitted, hologram data for a non-overlap region and hologram data corresponding to an overlap hologram region in a right-eye hologram region are transmitted, so it results in twice transmission of the hologram data corresponding to the overlap hologram region.

On the other hand, since the apparatus for transmitting hologram data transmits transmission hologram data corresponding to an entire binocular hologram region, hologram data corresponding to the non-overlap region of a right-eye hologram region, hologram data corresponding to the non-overlap region of a left-eye hologram region, and hologram data corresponding to an overlap hologram region are each transmitted one time. As a result, transmission hologram data created by the apparatus for transmitting hologram data provides an effect of compressing and transmitting hologram data without a loss by hologram data corresponding to an overlap hologram region in comparison to the case of separately extracting and transmitting left-eye hologram data and right-eye hologram data.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Accordingly, one of ordinary skill would understand that the scope of the claimed invention is not to be limited by the above explicitly described embodiments but by the claims and equivalents thereof.

What is claimed is:

1. A method for transmitting hologram data in a binocular holographic display, the method comprising:
   obtaining left-eye gaze information and right-eye gaze information on a viewing window plane of the binocular holographic display based on pupil images of a user of the binocular holographic display;
   determining a left-eye hologram region and a right-eye hologram region on a hologram plane of the binocular holographic display based on the left-eye gaze information, the right-eye gaze information, and distance information between the viewing window plane and the hologram plane; and
   creating transmission hologram data corresponding to one binocular hologram region including an overlap hologram region, in which the left-eye hologram region and the right-eye hologram region overlap each other, based on input hologram data,
   wherein the determining of a left-eye hologram region and a right-eye hologram region on a hologram plane of the binocular holographic display comprises:
      determining a left-eye gaze reaching point and a right-eye gaze reaching point of the user on the hologram plane based on the left-eye gaze information, the right-eye gaze information, and the distance information between the viewing window plane and the hologram plane; and
      determining the left-eye hologram region based on the left-eye gaze reaching point and preset left-eye hologram resolution information and determining the right-eye hologram region based on the right-eye gaze reaching point and preset right-eye hologram resolution information.

2. The method of claim 1, wherein the left-eye gaze information comprises a center of pupil for left-eye of the user on the viewing window plane and left-eye gaze direction information with respect to the hologram plane at the center of pupil for left-eye, and
   the right-eye gaze information comprises a center of pupil for right-eye of the user on the viewing window plane and right-eye gaze direction information with respect to the hologram plane at the center of pupil for right-eye.

3. The method of claim 1, wherein the left-eye hologram region is a region, which has the left-eye gaze reaching point as a center point and has a size determined based on the left-eye hologram resolution information, on the hologram plane.

4. The method of claim 1, wherein the right-eye hologram region is a region, which has the right-eye gaze reaching point as a center point and has a size determined based on the right-eye hologram resolution information.

5. The method of claim 1, wherein the one binocular hologram region includes the overlap hologram region in which the left-eye hologram region and the right-eye hologram region overlap each other, a non-overlap hologram region of the left-eye hologram region, and a non-overlap hologram region of the right-eye hologram region.

6. The method of claim 5, wherein the creating transmission hologram data comprises:
   creating hologram data corresponding to the overlap hologram region based on input hologram data for at least one of a left eye or a right eye;
   creating hologram data corresponding to the non-overlap hologram region of the left-eye hologram region based on input hologram data for the left eye; and
   creating hologram data corresponding to the non-overlap hologram region of the right-eye hologram region based on input hologram data for the right eye.

7. The method of claim 1, wherein the input hologram data is Fourier hologram data.

8. A non-transitory computer-readable recording medium storing a computer program, wherein the computer program includes a command for a processor to perform the method of claim 1.

9. An apparatus for transmitting hologram data, the apparatus comprising:
   a memory storing one or more instructions; and
   one or more processors executing the one or more instructions stored in the memory,
   wherein the processor
   obtains left-eye gaze information and right-eye gaze information on a viewing window plane of a binocular holographic display based on pupil images of a user of the binocular holographic display;
   determines a left-eye hologram region and a right-eye hologram region on a hologram plane of the binocular holographic display based on the left-eye gaze information, the right-eye gaze information, and distance information between the viewing window plane and the hologram plane; and
   creates transmission hologram data corresponding to one binocular hologram region including an overlap hologram region, in which the left-eye hologram region and the right-eye hologram region overlap each other, based on input hologram data, wherein the processor determines a left-eye gaze reaching point and a right-eye gaze reaching point of the user on the hologram plane based on the left-eye gaze information, the right-eye gaze information, and the distance information between the viewing window plane and the hologram plane; and determines the left-eye hologram region based on the left-eye gaze reaching point and preset left-eye hologram resolution information and determines the right-eye hologram region based on the right-eye gaze reaching point and preset right-eye hologram resolution information.

10. The apparatus of claim 9, wherein the left-eye gaze information comprises a center of pupil for left-eye of the user on the viewing window plane and left-eye gaze direction information with respect to the hologram plane at the center of pupil for left-eye, and the right-eye gaze information comprises a center of pupil for right-eye of the user on the viewing window plane and right-eye gaze direction information with respect to the hologram plane at the center of pupil for right-eye.

11. The apparatus of claim 10, wherein the left-eye hologram region is a region, which has the left-eye gaze reaching point as a center point and has a size determined based on the left-eye hologram resolution information, on the hologram plane.

12. The apparatus of claim 10, wherein the right-eye hologram region is a region that has the right-eye gaze reaching point as a center point and has a size determined based on the right-eye hologram resolution information.

13. The apparatus of claim 9, wherein the one binocular hologram region is a hologram region including the overlap hologram region in which the left-eye hologram region and the right-eye hologram region overlap each other, a non-overlap hologram region of the left-eye hologram region, and a non-overlap hologram region of the right-eye hologram region.

14. The apparatus of claim 13, wherein the processor
creates hologram data corresponding to the overlap hologram region based on input hologram data for at least one of a left eye or a right eye;
creates hologram data corresponding to the non-overlap hologram region of the left-eye hologram region based on input hologram data for the left eye; and
creates hologram data corresponding to the non-overlap hologram region of the right-eye hologram region based on input hologram data for the right eye.

15. The apparatus of claim 9, wherein the input hologram data is Fourier hologram data.

16. A method for transmitting hologram data in a binocular holographic display, the method comprising:
obtaining left-eye gaze information and right-eye gaze information on a viewing window plane of the binocular holographic display based on pupil images of a user of the binocular holographic display;
determining a left-eye hologram region and a right-eye hologram region on a hologram plane of the binocular holographic display based on the left-eye gaze information, the right-eye gaze information, and distance information between the viewing window plane and the hologram plane; and
creating transmission hologram data corresponding to one binocular hologram region including an overlap hologram region, in which the left-eye hologram region and the right-eye hologram region overlap each other, based on input hologram data,
wherein the one binocular hologram region includes the overlap hologram region in which the left-eye hologram region and the right-eye hologram region overlap each other, a non-overlap hologram region of the left-eye hologram region, and a non-overlap hologram region of the right-eye hologram region,
wherein the creating transmission hologram data comprises:
creating hologram data corresponding to the overlap hologram region based on input hologram data for at least one of a left eye or a right eye;
creating hologram data corresponding to the non-overlap hologram region of the left-eye hologram region based on input hologram data for the left eye; and
creating hologram data corresponding to the non-overlap hologram region of the right-eye hologram region based on input hologram data for the right eye.

* * * * *